(12) United States Patent
Weickert

(10) Patent No.: US 8,018,225 B2
(45) Date of Patent: Sep. 13, 2011

(54) SYSTEM AND METHOD FOR SENSING THE PERIODIC POSITION OF AN OBJECT

(75) Inventor: John Weickert, Fairfield, OH (US)

(73) Assignee: General Electric Company, Schenectady, NY (US)

(*) Notice: Subject to any disclaimer, the term of this patent is extended or adjusted under 35 U.S.C. 154(b) by 381 days.

(21) Appl. No.: 12/277,354

(22) Filed: Nov. 25, 2008

(65) Prior Publication Data

US 2010/0127694 A1    May 27, 2010

(51) Int. Cl.
*G01B 7/30* (2006.01)
(52) U.S. Cl. .................. 324/207.25; 324/164
(58) Field of Classification Search .............. 324/164, 324/207.25; 73/514.16, 514.31
See application file for complete search history.

(56) References Cited

U.S. PATENT DOCUMENTS

| | | | |
|---|---|---|---|
| 3,932,813 A | 1/1976 | Gallant | |
| 3,961,214 A | 6/1976 | Lokkart | |
| 4,922,757 A * | 5/1990 | Rozelle et al. | 73/660 |
| 4,937,522 A | 6/1990 | Gee | |
| 4,967,153 A | 10/1990 | Langley | |
| 5,012,207 A | 4/1991 | Edwards | |
| 5,144,231 A * | 9/1992 | Tenenbaum et al. | 324/164 |
| 6,208,135 B1 | 3/2001 | Shattil | |
| 6,927,567 B1 | 8/2005 | Roeseler et al. | |
| 2002/0145419 A1 | 10/2002 | Luetzow | |
| 2005/0127905 A1 | 6/2005 | Proctor et al. | |

FOREIGN PATENT DOCUMENTS

FR    2288313    5/1976

OTHER PUBLICATIONS

Honeywell: "Datasheet: High Temperature Quad Operational Amplifier HT1104"; Apr. 1998, pp. 1-8, XP002554399.

* cited by examiner

*Primary Examiner* — Bot Ledynh
(74) *Attorney, Agent, or Firm* — William Scott Andes; Gary M. Hartman; Domenica N.S. Hartman

(57) ABSTRACT

A system and method for sensing the periodic position of one or more objects, such as rotating blades of a turbine. The system includes a passive eddy current sensing unit having one or more magnets and first and second cores around which first and second coils are wound, respectively, which together generate first and second magnetic fields. The sensing unit is positioned so that the object periodically passes through the first and second magnetic fields in succession, and the first and second coils consequently produce first and second output signals, respectively. Each coil is individually connected to a processing circuitry that receives each of the first and second output signals. The circuitry electronically combines the first and second output signals so that common mode signals thereof electronically subtract from each other to eliminate from output of the circuitry any electromagnetic interference noise present in the first and second output signals.

20 Claims, 4 Drawing Sheets

SYSTEM AND METHOD FOR SENSING THE PERIODIC POSITION OF AN OBJECT

BACKGROUND OF THE INVENTION

The present invention generally relates to electronic equipment, and more particularly to a system that utilizes passive eddy current sensors to sense rotating equipment, such as the arrival, position, and/or vibration of turbine blades and other moving objects.

Passive eddy current sensors and variable reluctance sensors have been employed in a wide variety of applications to sense the proximity and speed of rotating equipment, including blades (buckets) of gas turbines. Another application is to sense the positions of rotating blades within the fan, booster, compressor and turbine sections of a gas turbine engine to monitor the health of the engine. In particular, the output of a passive eddy current sensor (or other suitable position sensor) can be used to monitor blade vibrations and steady-state blade circumferential positions over the life of the engine. Changes in blade vibrations or blade static positions can indicate damage to the component and signal that an inspection may be required to prevent a catastrophic failure of an engine component.

Passive eddy current sensors typically contain one or more permanent magnets adjacent one or more ferromagnetic cores wound with a wire coil. The permanent magnet is typically formed of a high magnetic energy product material, notable examples of which include iron-rare earth metal alloys (for example, Nd—Fe—B) and samarium alloys (for example, Sm—Co). The core is typically formed of a magnetic steel, though other suitable magnetic materials including low carbon steels may be used depending on operating conditions. When used to monitor the vibration of blade tips, a passive eddy current sensor is mounted to maximize the electrical signal generated as each blades passes in proximity to the sensor. In particular, the sensor is oriented so that, in the absence of a blade, magnetic flux is directed through one end of the magnet and toward the rotor and its blades, then arcs back through space to the ferromagnetic core. When a blade passes through the magnetic field, eddy currents form in the blade material and the local magnetic field shifts, producing a voltage potential across the leads of the coil. Because engine casings are typically formed largely of titanium, nickel, and other nonferrous materials that exhibit low magnetic reluctance, the ends of the magnet and core are not required to be inserted entirely through the engine casing, but instead can be mounted in an external recess in the wall such that a portion of the wall separates the sensor from the hot gas path of the engine.

In modern gas turbine engines, the output of a passive eddy current sensor used to monitor blade vibration is delivered to the engine's FADEC (full authority digital engine control) through appropriate connectors and wiring. Passive eddy current sensors are susceptible to electromagnetic interference (EMI) noise due to the many turns of wire typically present and required in the construction of their cores, as well the long cable runs between the sensor and the engine FADEC. U.S. Pat. No. 3,932,813 to Gallant is an example of a probe design with multiple coils capable of addressing EMI noise encountered when attempting to measure the speed of turbomachinery. The Gallant sensor has an E-shaped core whose center leg is a magnet and whose outer legs are formed of a ferromagnetic material. The center magnet establishes a symmetrical magnetic field through the two outer legs, each of which is wound with a wire coil. The coils are connected in series with a simple wire connection, with the result that EMI and other unwanted disturbances are subtracted from the output signal of the sensor.

The sensor taught by Gallant is disclosed as suitable for measuring the speed of a turbomachine, and not the position and vibrations of individual blades. Evaluations of passive eddy current sensors configured in accordance with Gallant have shown that the combined resistance and inductance of the wire and coils are too great for the sensor to have sufficient bandwidth to accurately sense the position and vibrations of individual airfoils. Such sensors also suffer from output wave shape limitations. Other examples of passive eddy current sensors with wire connections between coils for the purpose or having the effect of canceling noise include U.S. Pat. No. 4,967,153 to Langley, U.S. Pat. No. 5,373,234 to Kulczyk, and U.S. Pat. No. 6,483,293 to Chen. However each of these sensor designs suffers from decreased bandwidth and waveshape variations due to the combined resistance and inductance associated with having two coils wired in series.

More recent passive eddy current sensor designs specifically intended for blade detection are disclosed in U.S. Pat. Nos. 6,927,567 and 7,170,284 to Roeseler et al. Each of the disclosed sensors is a single-coil probe design intended or otherwise believed to improve signal bandwidth. However, neither appears to address the issue of operating in an EMI environment, and therefore these prior sensors do not appear to be capable of producing reliable measurements in a high EMI environment.

In view of the above, it would be desirable if a passive eddy current sensor were available that was capable of exhibiting the EMI resistance of multi-coil probe designs, while also capable of achieving the high bandwidth capability of single-coil probe designs, thereby providing the capability of sensing the position of gas turbine blades and other moving objects.

BRIEF DESCRIPTION OF THE INVENTION

The present invention provides a system and method suitable for sensing the arrival, position and/or vibration of moving objects, for example, rotating blades of a turbine.

According to a first aspect of the invention, the system includes a passive eddy current sensing unit comprising one or more magnets and first and second cores around which first and second coils are wound, respectively, the one or more magnets, the first and second cores, and the first and second coils cooperating to generate and detect first and second magnetic fields. The sensing unit is positioned relative to the object such that the object periodically passes through the first and second magnetic fields in succession, and the first and second coils produce first and second output signals in response to the object periodically and successively passing through the first and second magnetic fields. A wire connection is not present between the first and second coils, and instead each coil is individually connected to a processing circuitry that individually receives each of the first and second output signals. The processing circuitry electronically combines the first and second output signals to produce an output corresponding to the timing of the object as it periodically and successively passes through the first and second magnetic fields. The circuitry combines the first and second output signals so that common mode signals thereof electronically subtract from each other to eliminate from the output of the processing circuitry any electromagnetic interference noise present in the first and second output signals. By avoiding a series wire connection between the first and second coils, degradation of the bandwidth and wave shape interaction associated with a series wire connection between the first and second coils is eliminated, and the output of the processing circuitry is capable of having a clean sinusoidal waveform.

According to a second aspect of the invention, the method includes locating a passive eddy current sensing unit in proximity to an object such that the object periodically and successively passes through first and second magnetic fields to produce separate first and second output signals, respectively. The first and second output signals are then electronically combined to produce an output corresponding to the timing of the object as it periodically and successively passes through the first and second magnetic fields. The first and second output signals are combined so that common mode signals thereof subtract from each other to eliminate from the output any electromagnetic interference noise present in the first and second output signals.

According to a preferred aspect of the invention, the system and method are capable of providing gain for the first and second output signals of the first and second coil-wound cores. The gain capability enables the sensing unit to have minimal size, for example, one-fifth to one-tenth of the number of coil turns that would otherwise be required to produce a comparable signal level. The smaller size and fewer number of coil turns further increase the sensor bandwidth.

According to another preferred aspect of the invention, the system is well suited for use as a blade position sensor system installed on a turbine, such as a gas turbine engine, in which case the object is one of multiple rotating blades of the gas turbine and the sensing unit is located in proximity to the rotating blades. In this role, the circuitry sufficiently eliminates the effect of EMI present in the operating environment of the engine to enable the sensor unit to accurately perform the task of sensing the position of the rotating blades.

A significant advantage of the present invention is the ability of a passive eddy current sensor to exhibit a level of EMI resistance associated with multi-coil probe designs, while also exhibiting a high bandwidth capability associated with single-coil probe designs, along with the capability of achieving greater target sensitivity than either approach. Other advantageous aspects of the invention include the ruggedness of the circuitry, which preferably can operate and survive at temperatures exceeding 125° C. For example, the sensing unit and its circuitry are capable of being subjected to the high temperatures found in the operating environment of a gas turbine engine without requiring active cooling of the circuitry.

Other objects and advantages of this invention will be better appreciated from the following detailed description.

DETAILED DESCRIPTION OF THE INVENTION

Figure 1:
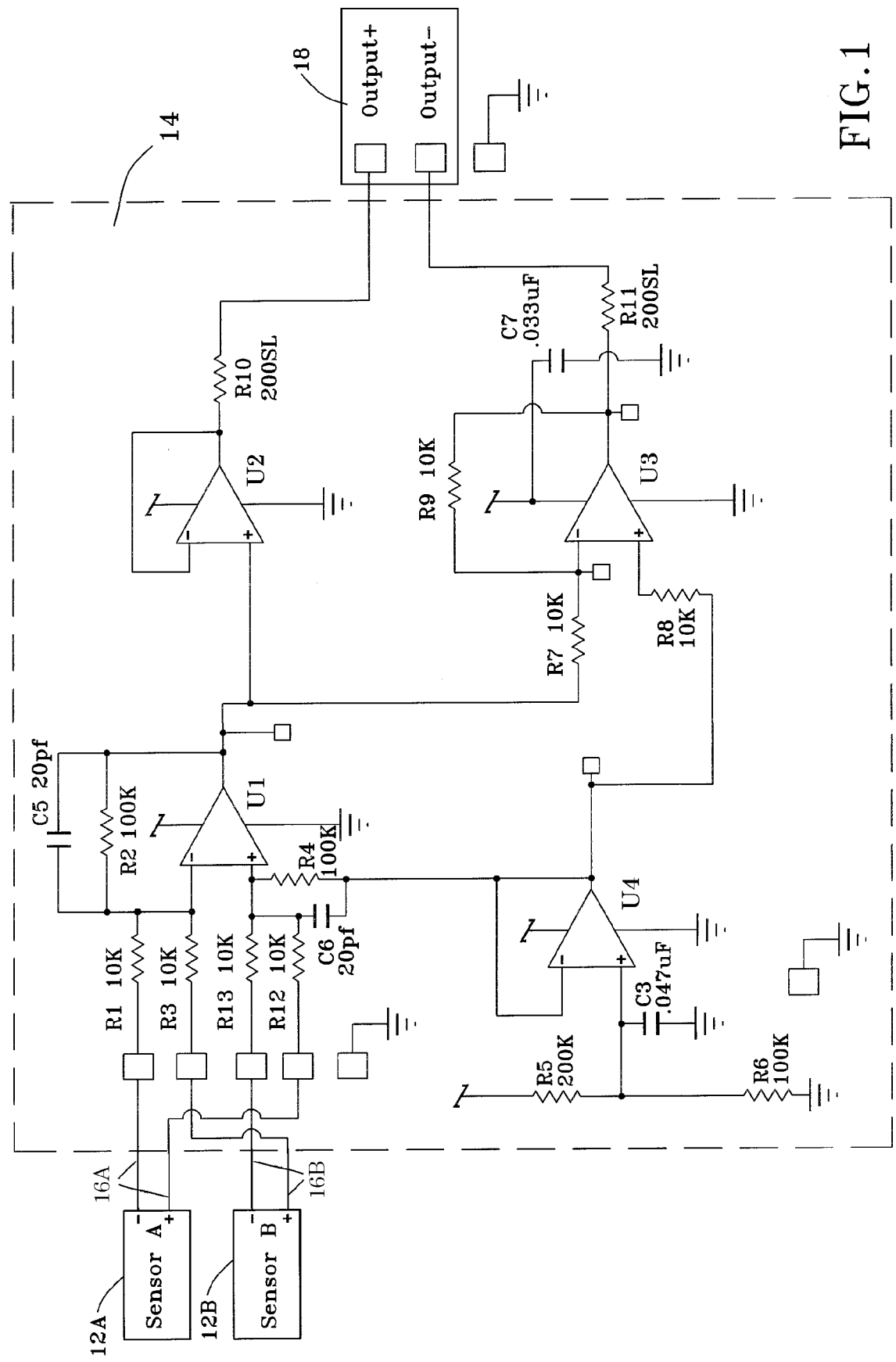
FIG. 1 is an electrical schematic showing passive eddy current sensors coupled to circuitry that electronically combines separate output signals of the sensors to produce an output in which electromagnetic interference noise present in the output signals is reduced or eliminated.
Figure 4:
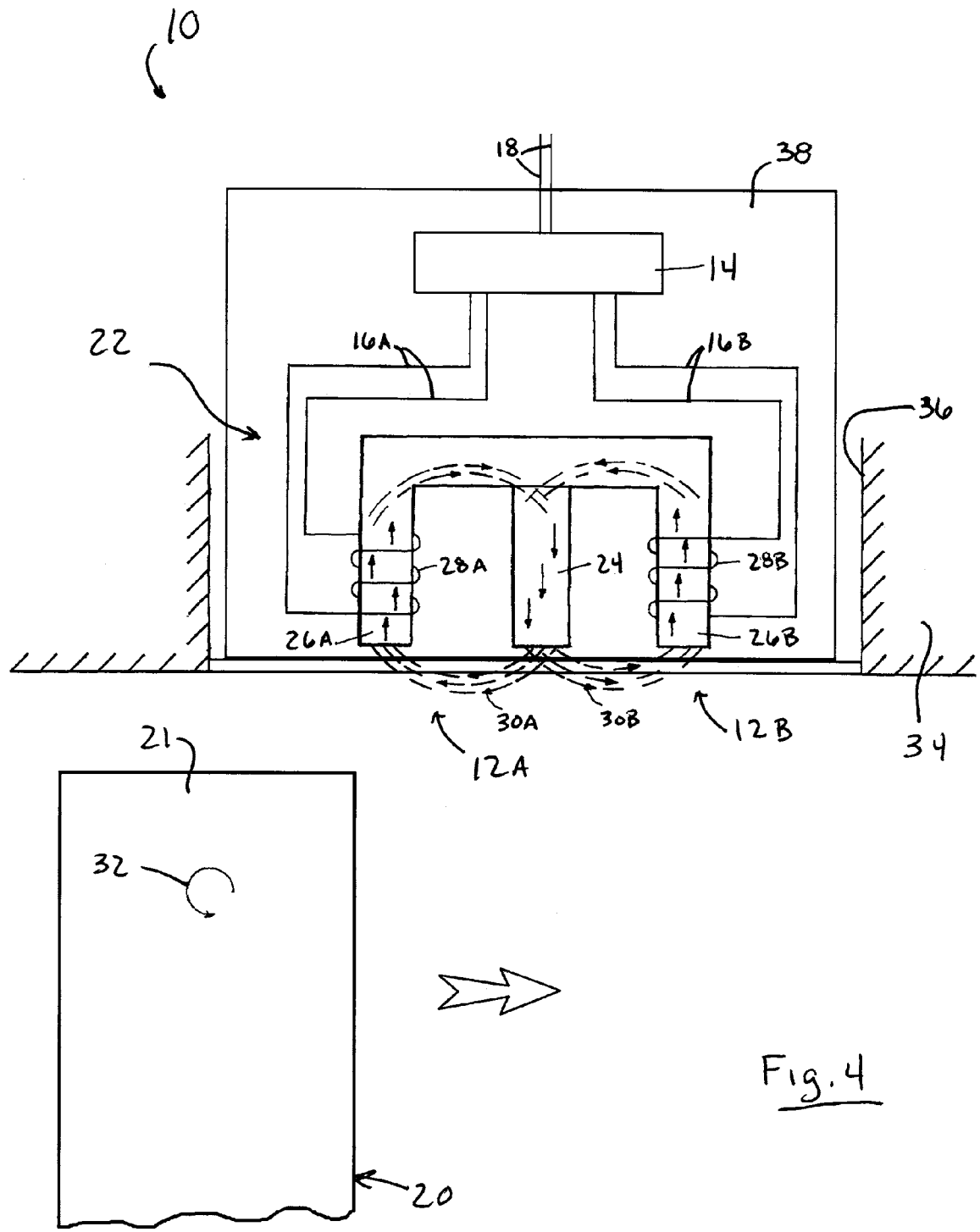
FIG. 4 schematically represents the sensors and circuitry of FIG. 1 installed in a gas turbine environment.

FIG. 1 is an electrical schematic of a sensing system 10 containing two passive eddy current sensors 12A and 12B coupled to analog electronic processing circuitry 14 that electronically combines separate output signals 16A and 16B of the sensors 12A and 12B, respectively. The processing circuitry 14 combines the output signals 16A-B of the sensors 12A-B in a manner that eliminates EMI noise from the system output 18 generated by the circuitry 14 by canceling any EMI noise present in the output signals 16A-B of the sensors 12A-B, as well as provides gain to the output signals 16A-B, with the result that the system 10 is also capable of exhibiting a high bandwidth capability and greater target sensitivity. The system 10 and sensors 12A-B will be discussed as particularly well suited for sensing the position of rotating equipment, such as blades (buckets) 20 of a gas turbine engine as represented in FIG. 4, though other applications are foreseeable. In such an application, after being conditioned by the circuitry 14, the output 18 generated by the circuitry 14 and processed from the sensors 12A-B can be delivered to the FADEC or other control system (not shown) of the gas turbine engine to improve the operation of the engine through monitoring of the positions and vibrations of the blade tips 21, as well as the rotational speed of the blades 20.

As represented in FIG. 4, the sensors 12A and 12B are combined in a sensor unit 22 that resembles the multi-coil E-shaped core configuration disclosed in U.S. Pat. No. 3,932,813 to Gallant, though it should be understood that other sensor configurations are possible and within the scope of this invention. For example, two single-coil sensors similar to those disclosed in U.S. Pat. Nos. 6,927,567 and 7,170,284 to Roeseler et al. could be used. The sensor unit 22 is shown to include a permanent magnet 24 between and adjacent a pair of ferromagnetic cores 26A and 26B, each of which is tightly wound with a single insulated wire coil 28A or 28B. The permanent magnet 24 is preferably formed of a high magnetic energy product material, such as an iron-rare earth metal alloy (for example, Nd—Fe—B) or a samarium alloy (for example, Sm—Co), and the cores 26A and 26B are preferably formed of a magnetic steel, though the use of other magnetic materials is within the scope of the invention. To monitor the positions and vibrations of the blade tips 21, the passive eddy current sensor unit 22 is shown mounted to maximize the electrical signal generated as each blade 20 passes in proximity to the sensor unit 22. In particular, the sensor unit 22 is oriented so that, in the absence of a blade 20, magnetic flux is directed through the end of the magnet 24 and toward the rotor and its blades 20, then arcs back through space along two separate flux paths to each of the ferromagnetic cores 26A and 26B. When a blade 20 successively passes through the magnetic fields 30A and 30B defined by the flux paths, eddy currents 32 form in the blade material and shifts occur in the local magnetic field 30A and then 30B, successively producing the signal outputs 16A-B in the form of a voltage potential across the leads of each coil 28A and 28B.

FIG. 4 depicts the sensor unit 22 mounted to an engine casing 34 surrounding the blades 20. If the engine casing 34 is formed largely of titanium, nickel, and other nonferrous materials that exhibits low magnetic reluctance, the ends of the magnet 24 and cores 26A-B are not required to be inserted entirely through the engine casing 34, but instead can be mounted in an external recess 36 in the casing 34 such that a portion of the casing 34 separates the sensor unit 22 from the hot gas path of the engine. Other aspects of the sensors 12A-B, including their operation, construction and installation are known in the art and will not be discussed further.

FIG. 4 represents the separate output signals 16A and 16B of the sensors 12A and 12B as traveling through cables to the processing circuitry 14, such that the circuitry 14 individually receives the separate output signals 16A and 16B. The circuitry 14 represented in FIG. 1 electronically combines the output signals 16A-B from the two coils 28A-B of the sensors 12A-B so that the common mode signal in both coils 28A-B subtracts from each other, eliminating EMI noise. In FIG. 1, signals from the negative lead of the sensor 12A ("Sensor A") and positive lead of the sensor 12B ("Sensor B") are combined and signals from the positive lead of the sensor 12A and negative lead of the sensor 12B are combined to serve as inputs to an amplifier. It should be noted that the circuitry 14 and the manner in which it is connected to the sensors 12A-B in FIG. 1 would not be compatible with the sensor configuration of Gallant, in which the cores are wired in series, because the circuitry 14 would subtract Gallant's sensor signals and cancel their outputs. In contrast, as the blade 20 passes by the sensor unit 22 of the present invention, the resulting output signals of the sensors 12A-B are of opposite polarity due to the direction of the magnetic fields 30A-B through their respective coils 28A-B. As a result, subtraction of their opposite polarity signals reinforces, instead of cancels, the blade passing signal, effectively providing gain to the signal outputs 16A-B. In FIG. 1, in which the resistance values of resistors R2 and R4 are equal and the resistance values of resistors R1, R3, R13 and R12 are equal, the gain is set by the ratio of the resistor values of resistor R2 to resistor R1, which in FIG. 1 is a ratio of 100/10 to yield a gain of 10. This gain capability reduces the size requirement of the passive eddy current sensor unit 22, for example, one-fifth to one-tenth of the number of coil turns that would be required to produce a comparable signal level. The smaller size and fewer number of coil turns also have the advantage of increasing the sensor bandwidth.

The four amplifiers represented in FIG. 1 are preferably implemented with silicon-on-insulator (SOI) substrates and processing technology to permit operating temperatures of up to about 260° C. (about 500° F.). As known in the art, SOI substrates typically comprises a thin epitaxial layer on an insulator. The substrate is typically formed by oxidizing one or both bonding surfaces of a pair of semiconductor (e.g., silicon) wafers prior to bonding the wafers. Most typically, a single silicon dioxide layer is grown on an epitaxial layer formed on a silicon wafer. After bonding the wafers, all but the insulator and epitaxial layer (and optionally the silicon layer of the second wafer) are etched away, such that the silicon dioxide layer forms an insulator that electrically isolates the epitaxial layer. A commercial example of solid-state amplifiers implemented on an SOI substrate using SOI processing technology is the HT1104 monolithic quad operational amplifier commercially available from Honeywell. With such high temperature capability, the circuitry 14 can be embedded into the sensor unit 22 or a housing 38 containing the sensor unit 22 (as shown in FIG. 4), preferably without the need for an active cooling system dedicated to maintaining the temperature of the circuitry 14 below 125° C. as required by conventional electronics. The term "active cooling" is used herein to mean cooling systems that are in addition to the sensors 12A-B, the circuitry 14, and their housing 38, and are specifically designed to transfer heat from the circuitry 14 by conduction, convection, and/or radiation.

The circuit 14 may further include low pass filtering and/or a differential line driving means. In FIG. 1, capacitors C5 and C6 with amplifier U1 provide low pass filtering to the output signals 16A-B of the sensors 12A-B. The values of C5 and C6 are set equally and are adjusted to provide additional EMI filtering beyond the inherent noise cancelling capability of the dual-coil design and common mode cancellation circuitry. The differential line driving function is implemented using amplifier U2 and resistor R10 and amplifier U3 and resistors R7, R8, R9 and R11. Differential line driving allows the sensor signal to be transmitted to the FADEC with greater EMI immunity.

Figure 2:
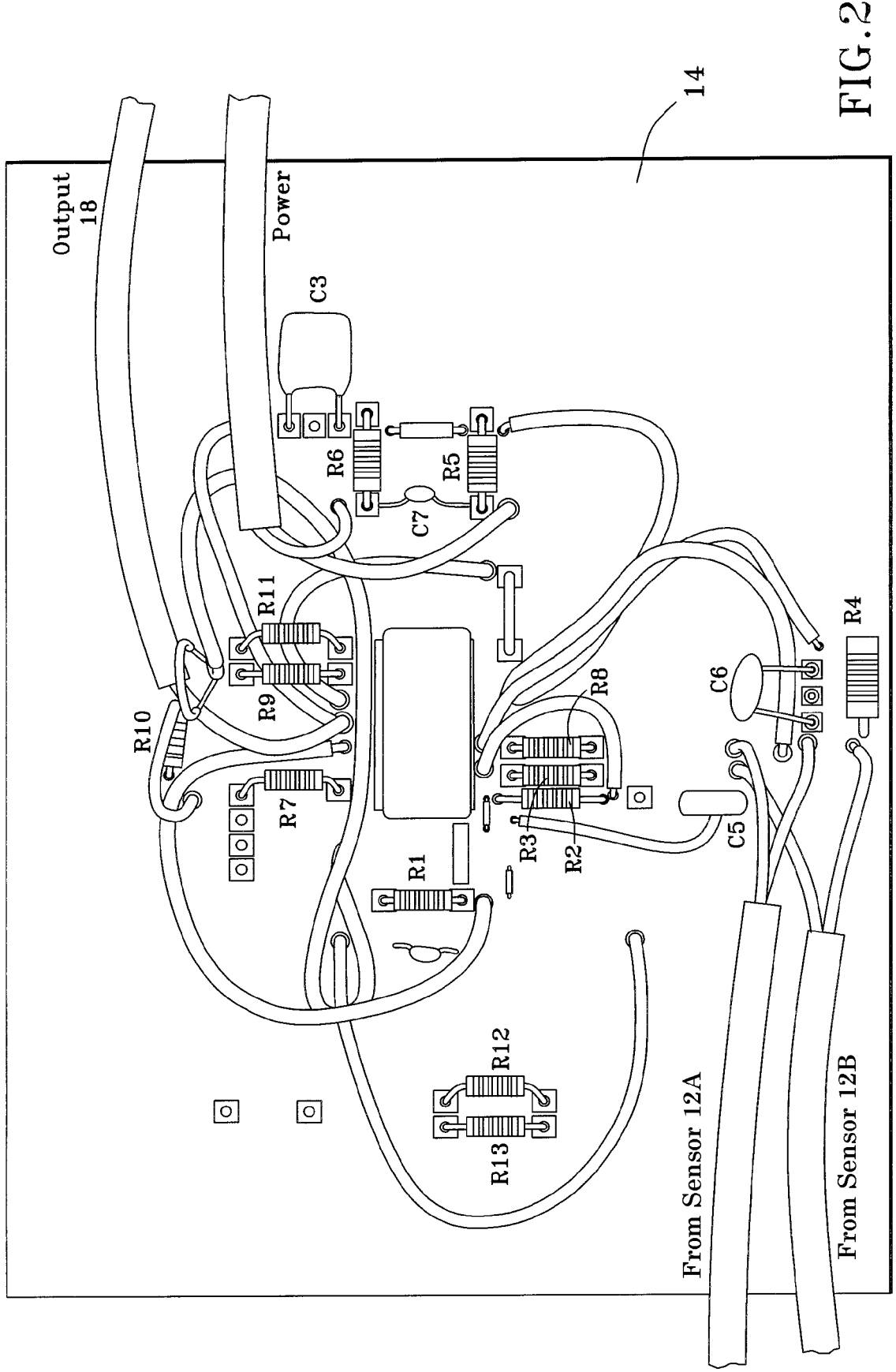
FIG. 2 is a representation of a prototype circuit constructed in accordance with the circuitry of FIG. 1.
Figure 3:
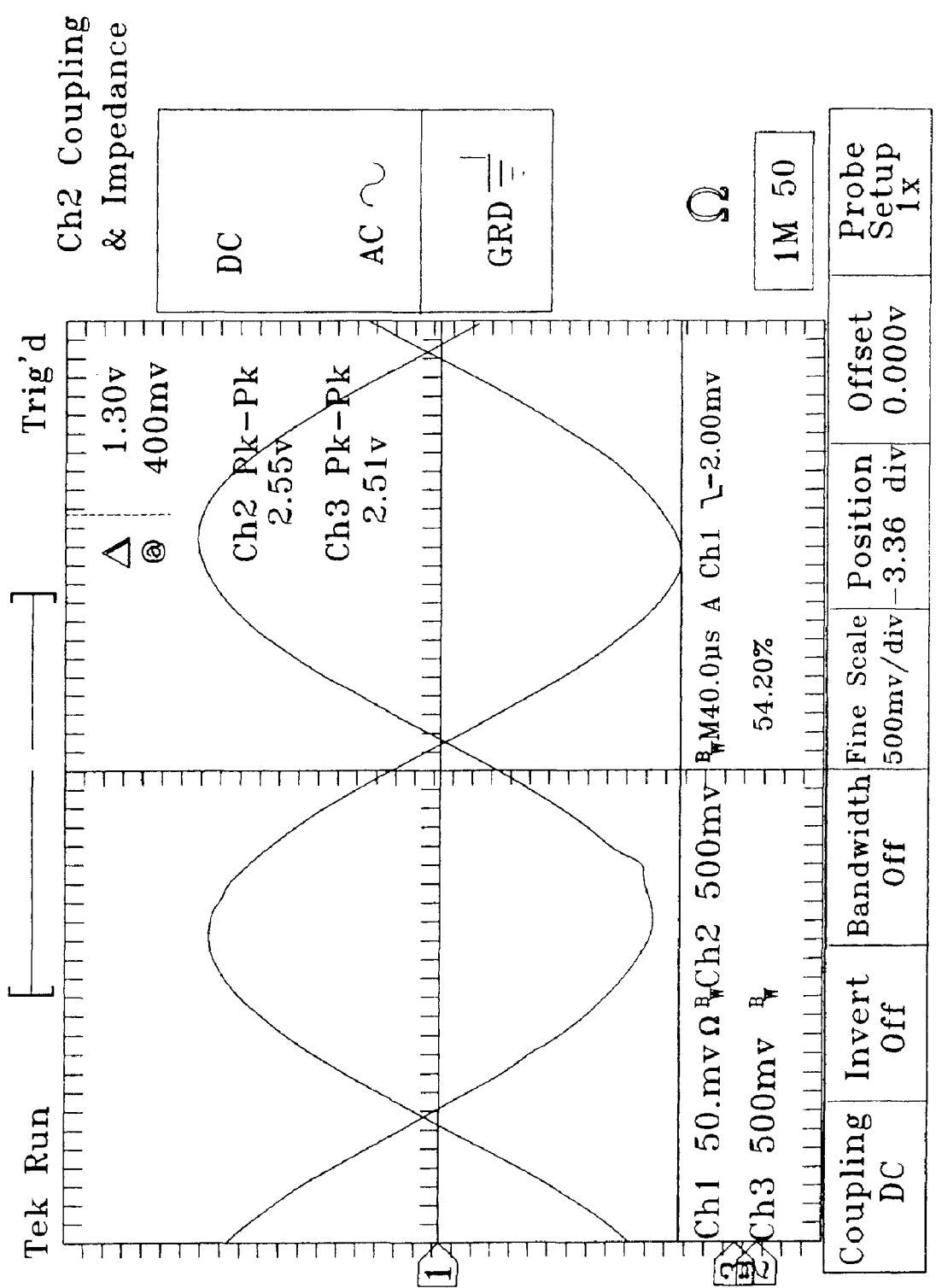
FIG. 3 is a graph showing the output signals of two passive eddy current sensors connected to the circuitry of FIG. 2.

In an investigation leading to the invention, a prototype circuit shown in FIG. 2 was constructed using the Honeywell HT1104 amplifier. Operationally, the prototype circuit was essentially identical to the circuitry 14 schematically represented in FIG. 1. Two identical passive eddy current sensors (not shown) were connected to the circuit and placed next to a source of EMI. The output of the circuit was then monitored while driving a load to simulate connection to a FADEC. The output of the circuit is shown in FIG. 3, and evidences that the common mode magnetic EMI noise was canceled out by the circuit.

While the invention has been described in terms of a preferred embodiment, it is apparent that other forms could be adopted by one skilled in the art. For example, the electrical values of the components indicated in FIG. 1 are for reference purposes only, and are not to be interpreted as limiting the scope of the invention, the physical configuration of the sensors 12A-B and circuitry 14 could differ from that shown, and materials and processes other than those noted could be used. Therefore, the scope of the invention is to be limited only by the following claims.

The invention claimed is:

1. A system for sensing the periodic position of an object, the system comprising:
    a passive eddy current sensing device comprising one or more magnets and first and second cores around which respective first and second coils are wound that are not in series with each other, the one or more magnets, the first and second cores, and the first and second coils cooperating to generate and detect first and second magnetic fields, the sensing device being positioned relative to the object such that the object periodically passes through the first and second magnetic fields in succession, the first and second coils producing first and second output signals, respectively, of opposite polarity in response to the object periodically and successively passing through the first and second magnetic fields; and
    circuitry individually connected to the first and second coils and individually receiving each of the first and second output signals of the first and second coils, the circuitry electronically subtracting the first and second output signals from each other to produce an object passing signal corresponding to the timing of the object as it periodically and successively passes through the first and second magnetic fields, the circuitry subtracting the opposite polarities of the first and second output signals to reinforce instead of cancel the object passing signal while subtracting common mode signals of the first and second signals from each other to eliminate from the object passing signal any electromagnetic interference noise present in the first and second output signals.

2. The system according to claim 1, wherein the circuitry further provides electronic gain of the first and second output signals and increases the bandwidth and signal level of the object passing signal.

3. The system according to claim 1, wherein the one or more magnets is a single magnet between the first and second cores, and the single magnet cooperates with each of the first and second cores and the first and second coils thereof to generate the first and second magnetic fields, respectively.

4. The system according to claim 1, wherein the circuitry comprises amplifiers implemented on silicon-on-insulator substrates.

5. The system according to claim 1, wherein the amplifiers have a maximum operating temperature of greater than 125° C.

6. The system according to claim 1, wherein the amplifiers have a maximum operating temperature of at least about 260° C.

7. The system according to claim 1, wherein the object comprises multiple rotating blades of a gas turbine, the system is a blade position sensor system installed on the gas turbine, and the sensing device is located in proximity to the rotating blades.

8. The system according to claim 7, wherein the system lacks an active cooling means for cooling the circuitry.

9. The system according to claim 1, wherein the circuitry and the sensing device are contained together within a housing.

10. The system according to claim 9, wherein the system lacks an active cooling means for cooling the circuitry.

11. A system for sensing the periodic position of rotating blades of a gas turbine, the system comprising:
- a sensing unit comprising first and second passive eddy current sensors, the first and second passive eddy current sensors comprising at least one magnet and first and second cores around which respective first and second coils are wound that are not in series with each other, the at least one magnet, the first core, and the first coil cooperating to generate and detect a first magnetic field, the at least one magnet, the second core, and the second coil cooperating to generate and detect a second magnetic field, the first and second passive eddy current sensors being positioned on the gas turbine such that the rotating blades periodically pass through the first and second magnetic fields in succession and the first and second coils produce first and second output signals of opposite polarity in response to the rotating blades passing through the first and second magnetic fields; and
- circuitry coupled to the sensing unit and electronically subtracting the first and second output signals of the first and second coils from each other to produce a blade passing signal corresponding to the timing of the rotating blades as they pass through the first and second magnetic fields, the circuitry subtracting the opposite polarities of the first and second output signals to reinforce instead of cancel the blade passing signal while subtracting common mode signals of the first and second signals from each other to eliminate from the blade passing signal any electromagnetic interference noise present in the first and second output signals, the reinforced blade passing signal further providing electronic gain of the first and second output signals and increasing the bandwidth and signal level of the blade passing signal.

12. The system according to claim 11, wherein the at least one magnet is a single magnet between the first and second cores, and the single magnet cooperates with each of the first and second cores and the first and second coils thereof to generate the first and second magnetic fields, respectively.

13. The system according to claim 11, wherein the circuitry comprises amplifiers implemented on silicon-on-insulator substrates.

14. The system according to claim 11, wherein the amplifiers have a maximum operating temperature of greater than 125° C.

15. The system according to claim 11, wherein the amplifiers have a maximum operating temperature of at least about 260° C.

16. The system according to claim 11, wherein the system lacks an active cooling means for cooling the circuitry.

17. The system according to claim 11, wherein the circuitry and the sensing unit are contained together within a housing.

18. A method of sensing the periodic position of an object, the method comprising:
- locating at least one passive eddy current sensing device in proximity to the object, the passive eddy current sensing device comprising one or more magnets and first and second cores around which respective first and second coils are wound that are not in series with each other;
- causing the object to periodically and successively pass through first and second magnetic fields generated by the sensing device to produce separate first and second output signals, respectively, of opposite polarity; and
- circuitry individually connected to the first and second coils and individually receiving each of the first and second output signals of the first and second coils, the circuitry electronically subtracting the first and second output signals from each other to produce an object passing signal corresponding to the timing of the object as it periodically and successively passes through the first and second magnetic fields, the circuitry subtracting the opposite polarities of the first and second output signals to reinforce instead of cancel the object passing signal while subtracting common mode signals of the first and second signals from each other to eliminate from the object passing signal output any electromagnetic interference noise present in the first and second output signals;
- electronically subtracting the first and second output signals from each other to produce an object passing signal corresponding to the timing of the object as it periodically and successively passes through the first and second magnetic fields, the opposite polarities of the first and second output signals being subtracted to reinforce instead of cancel the object passing signal while subtracting common mode signals of the first and second signals from each other to eliminate from the object passing signal any electromagnetic interference noise present in the first and second output signals.

19. The method according to claim 18, wherein the electronic combining step further provides electronic gain of the first and second output signals and increases the bandwidth and signal level of the object passing signal.

20. The method according to claim 18, wherein the object comprises multiple rotating blades of a gas turbine, the system is a blade position sensor system installed on the gas turbine, and the sensing device is located in proximity to the blades.

* * * * *